United States Patent
Chung et al.

(10) Patent No.: US 8,797,709 B2
(45) Date of Patent: Aug. 5, 2014

(54) MULTILAYER CERAMIC ELECTRONIC PART AND METHOD OF MANUFACTURING THE SAME

(71) Applicant: Samsung Electro-Mechanics Co., Ltd., Gyunggi-do (KR)

(72) Inventors: Hae Suk Chung, Suwon (KR); Min Cheol Park, Suwon (KR); Hyung Joon Kim, Suwon (KR); Byoung Hwa Lee, Suwon (KR)

(73) Assignee: Samsung Electro-Mechanics Co., Ltd., Suwon, Gyunggi-Do (KR)

( * ) Notice: Subject to any disclaimer, the term of this patent is extended or adjusted under 35 U.S.C. 154(b) by 74 days.

(21) Appl. No.: 13/670,037

(22) Filed: Nov. 6, 2012

(65) Prior Publication Data

US 2013/0120899 A1    May 16, 2013

(30) Foreign Application Priority Data

Nov. 14, 2011   (KR) .................. 10-2011-0118191

(51) Int. Cl.
   *H01G 4/005*   (2006.01)
   *H01G 4/228*   (2006.01)

(52) U.S. Cl.
   USPC .............. 361/303; 361/306.3; 29/25.42

(58) Field of Classification Search
   CPC .................. H01G 4/228; H01G 4/005
   USPC .............. 361/301.4, 306.3, 303; 29/25.42
   See application file for complete search history.

(56) References Cited

U.S. PATENT DOCUMENTS

| | | | | |
|---|---|---|---|---|
| 6,829,134 | B2* | 12/2004 | Yamauchi et al. | 361/303 |
| 8,400,753 | B2* | 3/2013 | Kim et al. | 361/303 |
| 2008/0080121 | A1* | 4/2008 | Togashi | 361/303 |
| 2009/0213525 | A1* | 8/2009 | Lee et al. | 361/303 |
| 2012/0113560 | A1* | 5/2012 | Takashima et al. | 361/301.4 |

FOREIGN PATENT DOCUMENTS

JP    2004-228514 A    8/2004

* cited by examiner

*Primary Examiner* — Eric Thomas
(74) *Attorney, Agent, or Firm* — McDermott Will & Emery LLP

(57) ABSTRACT

There is provided a multilayer ceramic electronic part, including: a ceramic element having a plurality of dielectric layers laminated therein; and a plurality of first and second internal electrodes each including a body part formed on at least one surface of each of the plurality of dielectric layers within the ceramic element, the first and second internal electrodes including first and second lead parts extended from one surfaces of the body parts to be exposed through one surface of the ceramic element, respectively, wherein inside connection portions between the body parts and the first and second lead parts are curvedly formed, and have a curvature radius of 30 to 100 μm.

24 Claims, 3 Drawing Sheets

MULTILAYER CERAMIC ELECTRONIC PART AND METHOD OF MANUFACTURING THE SAME

CROSS-REFERENCE TO RELATED APPLICATIONS

This application claims the priority of Korean Patent Application No. 10-2011-0118191 filed on Nov. 14, 2011, in the Korean Intellectual Property Office, the disclosure of which is incorporated herein by reference.

BACKGROUND OF THE INVENTION

1. Field of the Invention

The present invention relates to a multilayer ceramic electronic part and a method of manufacturing the same.

2. Description of the Related Art

As representative electronic parts using a ceramic material, there are provided a capacitor, an inductor, a piezoelectric element, a varistor, or a thermistor.

Among these ceramic electronic parts, multi-layer ceramic capacitors (MLCCs) have a small size, secure high capacitance, and have ease of mountability.

Multilayer ceramic capacitors are chip type condensers performing a main function of being charged with or discharging electricity while being mounted on a circuit board of various electronic products, such as a computer, a personal digital assistant (PDA), a cellular phone, or the like. Multi-layer ceramic capacitors have several sizes and lamination types depending on intended usage and capacity thereof.

In particular, as the trend has been for electronic products to be smaller, ultra-miniaturization and the provision of ultra-high capacity to multi-layer ceramic capacitors have been also required.

For this reason, a multi-layer ceramic capacitor in which dielectric layers and internal electrodes are thinned for the ultra-miniaturization of products and a large number of dielectric layers are laminated to provide ultra-high capacity therein has been manufactured.

As such, in order to satisfy the requirements for ultra-miniaturization and ultra-high capacitance in the multilayer ceramic capacitor, it is important to prevent a reduction of breakdown voltage (BDV: insulation resistance) and achieve low equivalent series inductance (ESL).

In the multilayer ceramic capacitor, in order to prevent a plating liquid from penetrating into an internal electrode through a dielectric layer, a margin part having a predetermined size is provided around the dielectric layer. Here, only a portion of the margin part is formed as a connection portion for electrically connecting the internal electrode and external electrodes.

Since the characteristics and reliability of the multilayer ceramic capacitor are influenced depending on the way in which the connection portion is designed, studies in relation to this matter are ongoing.

In addition, since the connection part has a different thickness from the margin part of the dielectric layer, and may be positioned more closely to the edge of the dielectric layer, the dielectric layers laminated during a manufacturing process may be delaminated due to a step portion therebetween.

SUMMARY OF THE INVENTION

An aspect of the present invention provides a multilayer ceramic electronic part, in which delamination and a reduction in breakdown voltage (BDV) may not occur, and having low equivalent series inductance (ESL) characteristics.

According to an aspect of the present invention, there is provided a multilayer ceramic electronic part, including: a ceramic element having a plurality of dielectric layers laminated therein; and a plurality of first and second internal electrodes each including a body part formed on at least one surface of each of the plurality of dielectric layers within the ceramic element, the first and second internal electrodes including first and second lead parts extended from one surface of the body parts to be exposed through one surface of the ceramic element, respectively, wherein inside connection portions between the body parts and the first and second lead parts are curvedly formed, and have a curvature radius of 30 to 100 μm.

In each of the body parts of the first and second internal electrodes, corner portions of an edge thereof may be curvedly formed.

A distance between the first lead part and the second lead part may be at least 200 μm or more.

The multilayer ceramic electronic part may further include first and second external electrodes formed on one surface of the ceramic element, and may be electrically connected to the first and second internal electrodes through exposed portions of the first and second lead parts, respectively.

The body part may have a thickness of 0.2 to 1.0 μm.

The first and second lead parts each may have a thickness of 0.2 to 1.0 μm.

The first and second lead parts may be disposed alternately with each other along a long side of each of the body parts.

The first and second lead parts may have the same width.

The first and second lead parts may have different widths.

The first and second lead parts may be positioned in the middle of the first and second external electrodes, respectively.

The first and second internal electrodes may be laminated in a direction perpendicular with respect to a forming direction of the first and second external electrodes.

The first and second external electrodes may be spaced apart from the one surface of the ceramic element.

According to another aspect of the present invention, there is provided a method of manufacturing a multilayer ceramic electronic part, including: forming first and second internal electrode layers on at least one surface of each of first and second ceramic sheets, respectively, and thereby defining margin parts outside the first and second internal electrode layers, respectively; forming first and second lead layers on a side portion of the margin parts on the first and second ceramic sheets, respectively, so as to allow the first and second internal electrode layers to be connected to one surfaces of the first and second ceramic sheets, respectively; laminating the plurality of the first and second ceramic sheets on which the first and second internal electrode layers and the first and second lead layers are respectively formed, alternately with each other, to form a laminate; and firing the laminate, wherein inside connection portions between the first and second internal electrode layers and the first and second lead layers are curvedly formed, and have a curvature radius of 30 to 100 μm.

In each of the first and second internal electrode layers, corner portions of an edge thereof may be curvedly formed.

A distance between the first lead layer and the second lead layer may be at least 200 μm or more.

The method may further include forming first and second external electrodes so as to cover exposed surfaces of the first and second lead layers.

The first and second internal electrode layers each may have a thickness of 0.2 to 1.0 μm.

The first and second lead layers each may have a thickness of 0.2 to 1.0 μm.

The first and second lead layers may be formed alternately with each other along a long side of the first or second internal electrode layer on the first and second ceramic sheets, respectively.

The first and second lead layers may have the same width.

The first and second lead layers may have different widths.

The first and second lead layers may be positioned in the middle of the first and second external electrodes, respectively.

In the laminate, the first and second ceramic sheets may be laminated such that the first and second internal electrode layers are disposed in a direction perpendicular to a forming direction of the first and second external electrodes.

The first and second external electrodes may be spaced apart from a surface of the laminate.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE INVENTION

Figure 1:
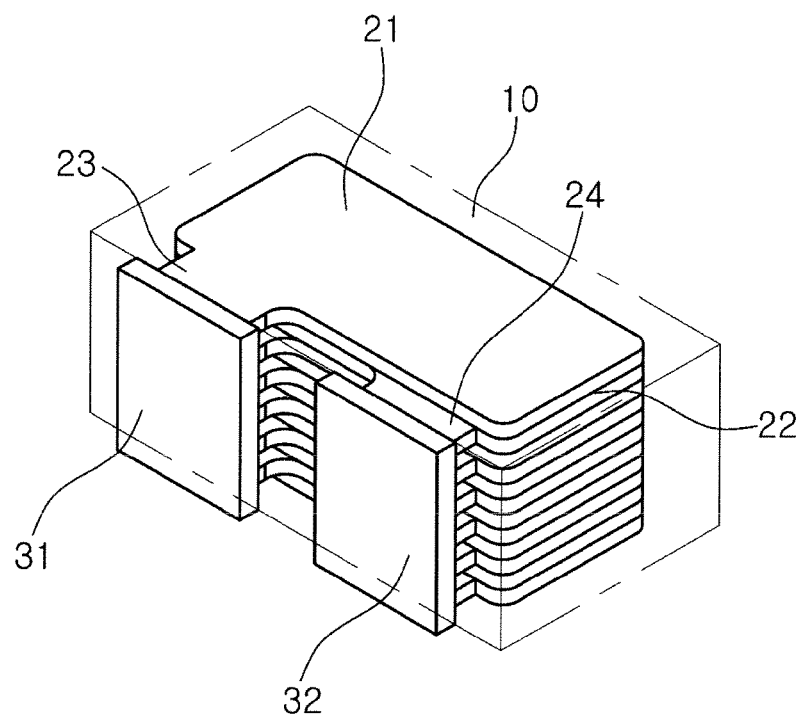
FIG. 1 is a perspective view showing a schematic structure of a multilayer ceramic capacitor according to an embodiment of the present invention.

Hereinafter, embodiments of the present invention will be described in detail with reference to the accompanying drawings.

However, the invention may be embodied in many different forms and should not be construed as being limited to the embodiments set forth herein.

The embodiments of the present invention are provided so that those skilled in the art may more completely understand the present invention.

In the drawings, the shapes and dimensions may be exaggerated for clarity, and the same reference numerals will be used throughout to designate the same or like components.

In addition, like reference numerals denote parts performing similar functions and actions throughout the drawings.

In addition, unless explicitly described otherwise, "comprising" any components will be understood to imply the inclusion of other components but not the exclusion of any other components.

The present disclosure is directed to a ceramic electronic part, and the ceramic electronic part according to an embodiment of the present invention is a multilayer ceramic capacitor, an inductor, a piezoelectric element, a varistor, a chip resistor, a thermistor, or the like. The multilayer ceramic capacitor will be described as one example of the ceramic electronic part as follows.

In addition, in the present embodiment, for the sake of convenient explanation, direction in which external electrodes are formed in a ceramic element is defined by a forward direction, and a direction along a lengthwise side of an internal electrode is defined by a left-right direction.

The multilayer ceramic capacitor of the present embodiment may be a 2-terminal vertically laminated or vertical multilayer capacitor, and the present invention is not limited thereto.

The "2-terminal" indicates that two terminals provided as terminals of the capacitor are connected to a circuit board. The "vertically laminated or vertical multilayer" indicates that internal electrodes laminated in the capacitor are disposed vertically to a mounting region surface of the circuit board.

Figure 2:
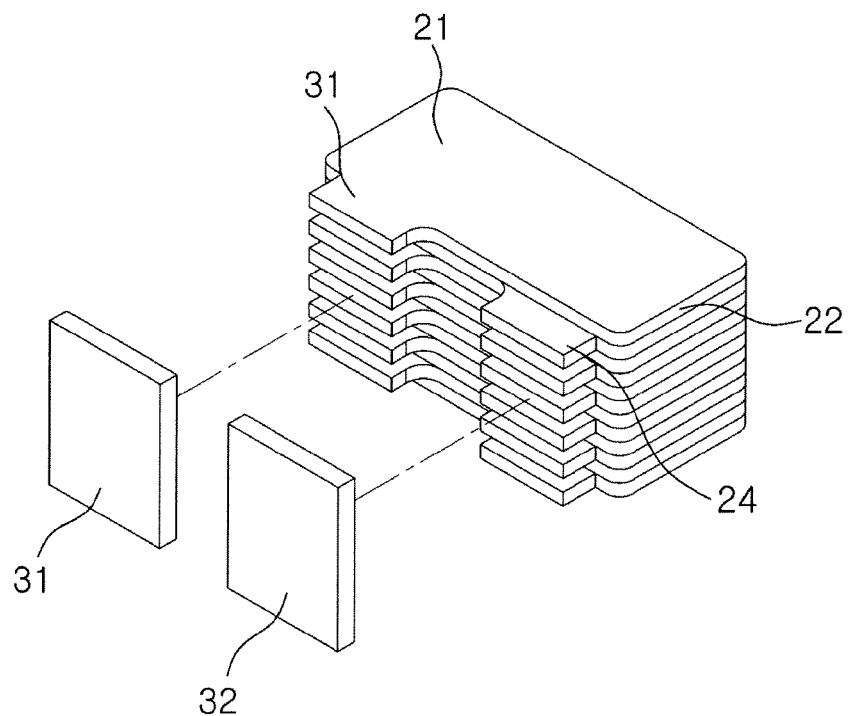
FIG. 2 is an exploded perspective view of FIG. 1.
Figure 3:
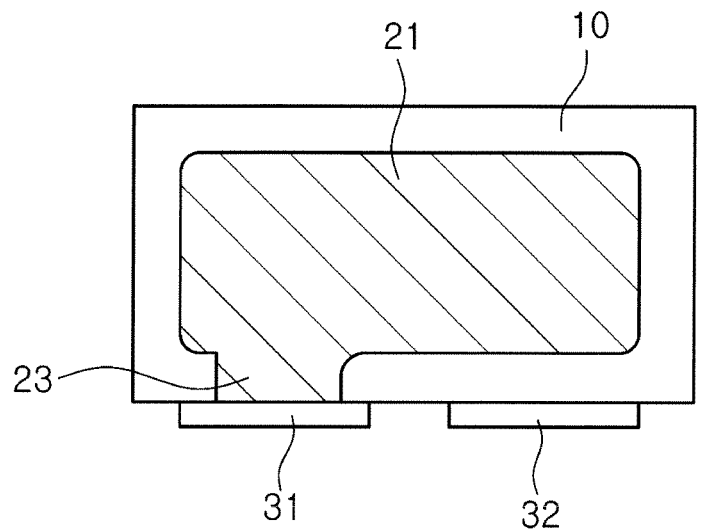
FIG. 3 is a cross-sectional view showing a coupling structure of a first internal electrode and a first external electrode.
Figure 4:
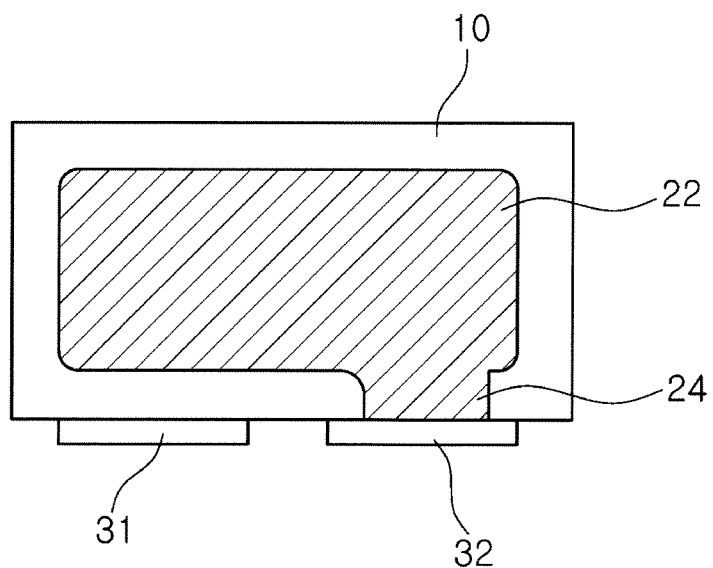
FIG. 4 is a cross-sectional view showing a coupling structure of a second internal electrode and a second external electrode, of FIG. 1.
Figure 5:
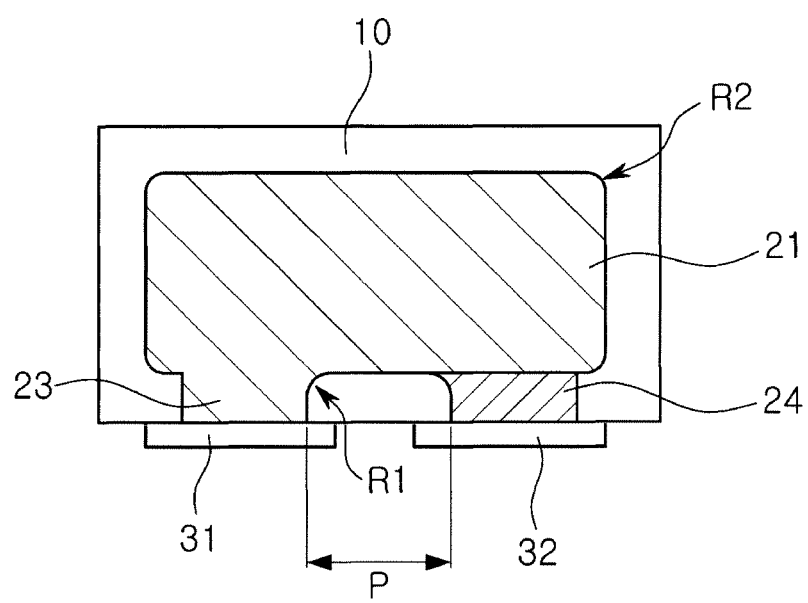
FIG. 5 is a cross-sectional view showing a coupling structure of the first and second internal electrodes and the first and second external electrodes of FIG. 1.

Referring to FIGS. 1 through 5, a multilayer ceramic capacitor 1 according to the present embodiment may include a ceramic element 10 having a plurality of dielectric layers laminated therein, and a plurality of first and second internal electrodes formed in the ceramic element 10.

These first and second internal electrodes may include body parts 21 and 22 and first and second lead parts 23 and 24, respectively. Each of the body parts 21 and 22 may be formed on at least one surface of each of the plurality of dielectric layers. The first and second lead parts 23 and 24 may be extended from the body parts 21 and 22, to be exposed through a side surface in a forward direction of the ceramic element 10, respectively.

Here, inside connection portions between the body parts 21 and 22 and the first and second lead parts 23 and 24 may be curvedly formed in order to prevent residual stress from being concentrated thereon. A curvature radius (R1) of the connection portion may be set to 30 to 100 μm.

In addition, corner portions of the edges of the body parts 21 and 22 of the first and second internal electrodes may be curvedly formed in order to prevent residual stress from being focused thereon. Here, a curvature radius (R2) of the corner portion may be set to 30 to 100 μm, similarly to the curvature radius (R1) of the connection portions.

These numerical values will be described in more detail by specifically comparing examples and comparative examples, as follows.

In addition, first and second external electrodes 31 and 32 may be formed on the side surface in a forward direction of the ceramic element 10 such that they contact exposed portions of the first and second lead parts 23 and 24 and thus they are electrically connected to the body parts 21 and 22.

The ceramic element 10 may be formed by laminating a plurality of dielectric layers.

Here, the plurality of dielectric layers constituting the ceramic element 10 may be sintered in one body so that a boundary between neighboring dielectric layers cannot be confirmed.

Also, the ceramic element 10 is not particularly limited in view of a shape thereof, but may generally have a rectangular parallelepiped shape.

In addition, the ceramic element 10 is not particularly limited in view of a dimension thereof, but for example, the ceramic element 10 may be formed in a size of 0.6 mm×0.3 mm or the like to constitute a multilayer ceramic capacitor having a high capacitance of 1.0 μF or higher.

In addition, as necessary, a dielectric cover layer (not shown) with a predetermined thickness may be formed on the outermost surface of the ceramic element 10, that is, on upper and lower surfaces of the ceramic element, in the drawings.

The dielectric layer constituting this ceramic element 10 may include a ceramic powder, for example, a $BaTiO_3$ based ceramic powder.

The $BaTiO_3$-based ceramic powder may be $(Ba_{1-x}Ca_x)TiO_3$, $Ba(Ti_{1-y}Ca_y)O_3$, $(Ba_{1-x}Ca_x)(Ti_{1-y}Zr_y)O_3$, $Ba(Ti_{1-y}Zr_y)O_3$, or the like, in which, Ca, Zr, or the like is partially solidified in $BaTiO_3$, but is not limited thereto.

The ceramic powder may have an average particle size of 0.8 µm or less, and in detail, of 0.05 to 0.5 µm, but is not limited thereto.

As necessary, the dielectric layer may further include at least one of transition metal oxides or carbides, rare earth elements, Mg, and Al, together with the ceramic powder.

In addition, a thickness of the dielectric layer may be arbitrarily changed depending on capacity design of the multilayer ceramic capacitor 1.

In the present embodiment, the dielectric layer may have a thickness of 1.0 µm, and specifically, may have 0.01 to 1.0 µm, but the present invention is not limited thereto.

The body parts 21 and 22 of the first and second internal electrodes may be formed of a conductive paste including a conductive metal.

Here, the conductive metal may be Ni, Cu, Pd or an alloy thereof, and the present invention is not limited thereto.

As such, the conductive paste may be printed on the ceramic green sheets for dielectric layers by a printing method, such as screen printing or gravure printing, to form the internal electrode layers on the ceramic green sheets, respectively. Then, the ceramic green sheets on which the internal electrode layers have been printed are laminated alternately with each other, and followed by firing, thereby forming the ceramic element 10.

Therefore, a capacitance may be formed in a region in which the body parts 21 and 22 of the first and second internal electrodes overlap each other.

In addition, the thickness of the body parts 21 and 22 of the first and second internal electrodes may be determined depending on usage thereof, and for example, may be determined within a range of 0.2 to 1.0 µm in consideration of the size of the ceramic element 10. However, the present invention is not limited thereto.

When the first and second internal electrodes are formed on the dielectric layers, predetermined margin parts may be left on a portion of the dielectric layers excluding the body parts 21 and 22 of the first and second internal electrodes, respectively, in order to prevent moisture or a plating liquid from permeating into the laminate and prevent electric short circuits.

Therefore, the first and second lead parts 23 and 24 may be formed on the margin parts of the dielectric layers respectively, such that they are extended from one surfaces of the body parts 21 and 22 of the first and second internal electrodes in a forward direction, respectively, in order that the body parts 21 and 22 of the first and second internal electrodes are electrically connected to the first and second external electrodes 31 and 32, respectively, the first and second external electrodes being formed on the side surface of the ceramic element and having different polarities.

Ends of the first and second lead parts 23 and 24 may be exposed through the side surface in a forward direction of the ceramic element 10.

Here, a distance between the first lead part 23 and the second lead part 24 may be set to 200 µm or less in order to prevent de-lamination.

The first and second lead parts 23 and 24 should not overlap each other in order to be connected to only the first and second external electrodes having different polarities, respectively.

Therefore, the first and second lead parts 23 and 24, on the long side of the body parts 21 and 22, may be disposed alternately with each other in a stacking direction of the first and second internal electrodes to the left and to the right.

Here, widths of the first and second lead parts 23 and 24 may be the same as each other, but the present invention is not limited thereto. As necessary, lengths of the first and second lead parts 23 and 24 may be different.

Since the lengths of the first and second lead parts 23 and 24 substantially correspond to the margin parts of the dielectric layers, the lengths of the first and second lead parts 23 and 24 may be determined by controlling widths of the margin parts when the body parts 21 and 22 of the first and second internal electrodes are formed, respectively.

In addition, the first and second lead parts 23 and 24 may be determined to have the same thickness as that of the body parts 21 and 22 of the first and second internal electrodes.

For example, in the present embodiment, since the body parts 21 and 22 of the first and second internal electrodes each have a thickness of 0.2 to 1.0 µm, the thickness of each of the first and second lead parts 23 and 24 may be determined to be 0.2 to 1.0 µm, but the present invention is not limited thereto.

In the present embodiment, the first and second external electrodes 31 and 32 may be only formed on the side surface in a forward direction of the ceramic element 10.

Therefore, since a total mounting area in the present embodiment is relatively reduced as compared with other structures in which left and right external electrodes are formed, mounting density of the circuit board may be increased according to the present embodiment.

Here, more specifically, the first and second internal electrodes 21 and 22 may be laminated in a vertical direction with respect to a direction in which the first and second external electrodes 31 and 32 are formed, in order to increase the mounting density of the circuit board.

Meanwhile, the first and second external electrodes 31 and 32 may be formed to have a height corresponding to that of the ceramic element 10 so that they are stably connected to the body parts 21 and 22 of the plurality of first and second internal electrodes laminated upwardly or downwardly.

However, the present invention is not limited thereto, and, as necessary, the first and second external electrodes 31 and 32 may be formed to be higher or lower than the ceramic element 10.

In addition, in order to effectively prevent the permeation of a plating liquid, the first and second external electrodes 31 and 32 may be formed such that the first and second lead parts 23 and 24 are positioned in the middle of the first and second external electrodes 31 and 32 with respect to the left-right direction of the first or second internal electrode 21 or 22.

In addition, the first and second external electrodes 31 and 32 may be spaced apart from the surface of the ceramic element 1, but the present invention is not limited thereto.

Operations of the multilayer ceramic capacitor 1 of the present embodiment constituted as above will be described.

When the first and second internal electrodes are formed on the dielectric layers, predetermined margin parts may be prepared on a portion of the dielectric layers excluding the body parts 21 and 22 of the first and second internal electrodes, respectively.

These margin parts may serve to prevent moisture or the plating liquid from permeating into the body parts 21 and 22 of the first and second internal electrodes after the respective dielectric layers are laminated to form the ceramic element 10, and may serve to prevent an electric short circuit by protecting the first and second internal electrodes from the external impact.

As described above, in the present embodiment, each of the first and second lead parts 23 and 24 may be formed on the one region of the margin part, and the body parts 21 and 22 of the first and second internal electrodes are electrically connected to the first and second external electrodes 31 and 32.

Here, the margin part may be formed to be relatively small in order to secure a relatively large capacitance of the first and second internal electrodes, but need to have a relatively minimum width in order to prevent the permeation of the plating liquid.

In a case in which the inside connection portions between the body parts 21 and 23 and the first and second lead parts 23 and 24, of the first and second internal electrodes are bent, charges may accumulate at the inside connection portions, resulting in relatively large electric field. Thus, repetitive appliance of voltage may cause the corresponding portions to be degraded relatively rapidly, resulting in shortening lifespan of a product. Therefore, the inside connection portions may be curvedly formed.

Here, when a curvature radius (R1) of the connection portion is below 30 μm, there may be several defects as occurring in the connection portion of the related art having an angled shape, such as concentration of electric field thereon or an increase in an ESL value, as described above.

In addition, when a curvature radius (R1) of the connection portion is above 100 μm, that is, a shape thereof is relatively too round, a BDV may be degraded.

Therefore, a range of the curvature radius (R1) of the connection portion may be set to 30 to 100 μm, for preventing delamination and BDV degradation while having a low ESL value.

Also, in a case in which the corner portions of the edge of each of the body parts 21 and 22 of the first and second internal electrode are bent, charges may accumulate at the corner portions thereof, resulting in relatively larger electric field. Thus, repetitive appliance of voltage may cause the corresponding portions to be degraded relatively rapidly, resulting in shortening lifespan of a product. Therefore, the corner portions may be curvedly formed.

Here, when a curvature radius (R2) of the corner portion is below 30 μm, there may be several defects as occurring in the corner portion of the related art having an angled shape, such as concentration of electric field thereon or an increase in an ESL value.

In addition, when a curvature radius (R2) of the corner portion is above 100 μm, that is, a shape thereof is relatively too round, a BDV may be degraded.

Therefore, a range of the curvature radius (R2) of the corner portion may be set to 30 to 100 μm, for preventing delamination and BDV degradation while having a low ESL value, similarly to the curvature radius (R1) of each of the inside connection portions between the body parts 21 and 22 and the first and second lead parts 23 and 24.

Hereinafter, the present invention will be described in detail by exemplifying inventive examples and comparative examples therefor.

As described above, when the curvature radius of each of the inside connection portions between the body parts 21 and 22 and the first and second lead parts 23 and 24 was R1, a length in a left-right direction of a molded sheet was L, and a width of the molded sheet was W; properties of multilayer ceramic capacitors were measured as shown in Tables 1 through 4 below.

Chips to be evaluated were manufactured by printing the first and second internal electrodes having the body parts 21 and 22 and the first and second lead parts 23 and 24, and first and second external electrodes 31 and 32, with respect to molded sheets with a thickness of 2 μm, according to sizes thereof.

As shown in Table 1, a length (L) and a width (W) of the molded sheet were set to 1.0 mm and 0.5 mm respectively, and the curvature radius (R1) of each of the inside connection portions between the body parts 21 and 22 and the first and second lead part 23 and 24 were variously changed.

Thereafter, among 100 chips, the number of chips in which delamination occurred was checked and BDV values of the respective chips were checked.

TABLE 1

|   | R1 (mm) | L (mm) | W (mm) | # of delam [ea/100 ea] | BDV (V) |
|---|---|---|---|---|---|
| 1 | 0.020 | 1.0 | 0.5 | 6 | 153 |
| 2 | 0.028 | 1.0 | 0.5 | 1 | 162 |
| 3 | 0.032 | 1.0 | 0.5 | 0 | 223 |
| 4 | 0.035 | 1.0 | 0.5 | 0 | 231 |
| 5 | 0.047 | 1.0 | 0.5 | 0 | 235 |
| 6 | 0.060 | 1.0 | 0.5 | 0 | 238 |
| 7 | 0.070 | 1.0 | 0.5 | 0 | 237 |
| 8 | 0.095 | 1.0 | 0.5 | 0 | 242 |
| 9 | 0.104 | 1.0 | 0.5 | 0 | 174 |
| 10 | 0.110 | 1.0 | 0.5 | 0 | 165 |

<Number of Chips in which Delamination of Multilayer Ceramic Capacitor Occurred, and BDV Value, According to the Curvature Radius of Inside Connection Portion Between Body Part and Lead Part of Internal Electrode>

Referring to Table 1, in Samples 1 and 2, which were comparative examples, a curvature radius (R1) of each of the inside connection portions between the body parts 21 and 22 and the first and second lead parts 23 and 24 of the internal electrodes was below 30 μm. In these cases, many defective products having BDV reduction and delamination due to concentration of electric field were found, and thus, it could be seen that there was reliability degradation thereof.

In Samples 9 and 10, which were comparative examples, a curvature radius (R1) of each of the inside connection portions between the body parts 21 and 22 and the first and second lead parts 23 and 24 of the internal electrodes was above 100 μm. In these cases, it could be seen that a distance between the first internal electrode and the second internal electrode was decreased, resulting in BDV degradation.

Therefore, according to Table 1, when the curvature radius (R1) of each of the inside connection portions between the body parts 21 and 22 and the first and second lead parts 23 and 24 of the internal electrodes was in a range of 30 to 100 μm, delamination and BDV degradation could be prevented, as in the other samples excluding the comparative examples. For this reason, it can be seen that a numerical range of the curvature radius (R1) of the connection portion is 30 to 100 μm.

TABLE 2

|   | P (mm) | L (mm) | W (mm) | # of delam [ea/100 ea] |
|---|---|---|---|---|
| 1 | 0.016 | 0.4 | 0.2 | 8 |
| 2 | 0.018 | 0.4 | 0.2 | 1 |
| 3 | 0.021 | 0.4 | 0.2 | 0 |
| 4 | 0.023 | 0.4 | 0.2 | 0 |
| 5 | 0.024 | 0.4 | 0.2 | 0 |

<Number of Chips in which Delamination of Multilayer Ceramic Capacitor Occurred, According to the Distance Between First Lead Part and Second Lead Part>

Referring to Table 2, in Samples 1 and 2, which were comparative examples, a distance (P) between the first lead part 23 and the second lead part 24 was below 200 μm. In these cases, many defective products having delamination were found, and thus, it could be seen that there was reliability degradation thereof.

TABLE 3

| | P (mm) | L (mm) | W (mm) | # of delam [ea/100 ea] |
|---|---|---|---|---|
| 1 | 0.016 | 0.6 | 0.3 | 10 |
| 2 | 0.018 | 0.6 | 0.3 | 2 |
| 3 | 0.021 | 0.6 | 0.3 | 0 |
| 4 | 0.023 | 0.6 | 0.3 | 0 |
| 5 | 0.024 | 0.6 | 0.3 | 0 |

<Number of Chips in which Delamination of Multilayer Ceramic Capacitor Occurred, According to the Distance Between First Lead Part and Second Lead Part>

As shown in Table 3, a length (L) and a width (W) of the molded sheet were set to 0.6 mm and 0.3 mm respectively, and the distance (P) between the first lead part 23 and the second lead part 24 was variously changed. Then, the number of chips in which delamination occurred, among 100 chips, was checked.

Referring to Table 3, in Samples 1 and 2, which were comparative examples, a distance (P) between the first lead part 23 and the second lead part 24 was below 200 μm in a multilayer ceramic capacitor thereof. In these cases, many defective products having delamination were found, and thus, it could be seen that there was reliability degradation thereof.

TABLE 4

| | P (mm) | L (mm) | W (mm) | # of delam [ea/100 ea] |
|---|---|---|---|---|
| 1 | 0.016 | 1.0 | 0.5 | 12 |
| 2 | 0.018 | 1.0 | 0.5 | 3 |
| 3 | 0.021 | 1.0 | 0.5 | 0 |
| 4 | 0.023 | 1.0 | 0.5 | 0 |
| 5 | 0.024 | 1.0 | 0.5 | 0 |

<Number of Chips in which Delamination of Multilayer Ceramic Capacitor Occurred, According to the Distance Between First Lead Part and Second Lead Part>

As shown in Table 4, a length (L) and a width (W) of the molded sheet were set to 1.0 mm and 0.5 mm respectively, and the distance (P) between the first lead part 23 and the second lead part 24 was variously changed. Then, the number of chips in which delamination occurs, among 100 chips, was checked.

Referring to Table 4, in Samples 1 and 2, which were comparative examples, a distance (P) between the first lead part 23 and the second lead part 24 was below 200 μm in a multilayer ceramic capacitor. In these cases, many defective products having delamination were found, and thus, it could be seen that there was reliability degradation thereof.

Therefore, according to Tables 2 to 4, when the distance (P) between the first lead part 23 and the second lead part 24 is above 200 μm, delamination did not occur, in Samples 3 to 5. For this reason, it can be seen that a numerical range of the distance (P) between the first lead part 23 and the second lead part 24 may be within a range of 200 μm or more.

Hereinafter, a method of manufacturing a multilayer ceramic capacitor according to the embodiment of the present invention will be described.

A plurality of ceramic green sheets may be prepared.

The ceramic green sheet may be for forming a dielectric layer of a ceramic element 10, and may be formed by mixing a ceramic powder, a polymer, and a solvent to prepare a slurry and molding the slurry into a sheet with a thickness of several μm through doctor blade method or the like.

Then, first and second internal electrode layers each may be formed by printing a conductive paste on at least one surface of each of the ceramic green sheets in a thickness of, for example, 0.2 to 1.0 μm.

Here, the conductive paste may be printed on the ceramic green sheet such that the first or second internal electrode layers are formed and a margin part is defined as a portion of the ceramic green sheet excluding the first or second internal electrode layer.

Then, first and second lead layers each may be formed by printing a conductive paste on the margin part in a frontward direction of each of the ceramic green sheets in a predetermined thickness, for example, 0.2 to 1.0 μm, in a similar manner in which the first and second internal electrode layers are formed. Here, the first and second lead layers may be formed such that the first and second internal electrode layers are connected to side surfaces in a forward direction of the first and second ceramic green sheets, respectively.

Here, inside connection portions between the first and second internal electrode layers and the first and second lead layers may be curvedly formed, and a curvature radius of each of the connection portions may be controlled to be 30 to 100 μm so as to prevent delamination, a low ESL value, and BDV degradation.

In addition, corner portions of the edge of each of the first and second internal electrode layers may be curvedly formed. Here, a curvature radius of each of the corner portions may be controlled to be 30 to 100 μm so as to prevent delamination and BDV degradation.

In addition, the first and second lead layers may be spaced apart from each other. Here, a distance between the first lead layer and the second lead layer may be at least 200 μm or more so as to prevent delamination.

Since the first and second internal electrode layers have different polarities, the first and second lead layers are alternately disposed such that they do not overlap along a long side of the first and second internal electrode layers when a plurality of green sheets are laminated.

In addition, the first and second lead layers may have the same width, but the present invention is not limited thereto. The widths of the first and second lead layers may be different, as necessary.

As the printing method of the conductive paste, screen printing, gravure printing, or the like may be employed. As examples of the conductive paste, a metal powder, a ceramic powder, a silica ($SiO_2$) powder, or the like, may be used.

The conductive paste may have an average particle size of 50 to 400 nm, but the present invention is not limited thereto.

Also, the metal powder may be one of nickel (Ni) manganese (Mn), chromium (Cr), cobalt (Co), and aluminum (Al), or an alloy thereof.

Then, after the plurality of ceramic green sheets having the first and second internal electrode layers and the first and second lead layers are laminated, a pressure may be applied in a lamination direction, thereby compressing the plurality of ceramic green sheets and the conductive paste formed on each of the ceramic green sheets to each other.

Therefore, there may provided a laminate in which the plurality of dielectric layers and the plurality of first and second internal electrodes 21 and 22 are alternately laminated, and the first lead part 23 and the second lead part 24 are alternately disposed along a long side of the first or second internal electrode 21 or 22.

Then, the laminate is cut into chips by cutting each region of the laminate corresponding to one capacitor, and then the chips are fired at a high temperature, thereby completing the ceramic element 10.

The first and second external electrodes 31 and 32 may then be formed to cover the ends of the first and second lead parts 23 and 24, exposed through a side surface in a forward direction of the ceramic element 10.

In other words, the first and second external electrodes 31 and 32 may be connected to the first and second lead parts 23 and 24, respectively, so that they can be electrically connected to the first and second internal electrodes 21 and 22.

In addition, the first and second external electrodes 31 and 32 may be formed to have a height corresponding to that of the ceramic element 10 so as to secure a sufficient contact area with the first and second lead parts 23 and 24 and increase the connectivity therewith.

Also, in order to prevent IR degradation by improving an effect of preventing the permeation of a plating liquid, the first and second external electrodes 31 and 32 may be formed such that the first and second lead parts 23 and 24 are positioned in the middle of the first and second external electrodes 31 and 32 with respect to the left-right direction of the first or second internal electrode 21 or 22.

Also, as necessary, surfaces of the first and second external electrodes 31 and 32 may be plate-treated with nickel, tin, or the like.

As set forth above, according to one embodiment of the present invention, there can be provided a multilayer ceramic electronic part, capable of preventing delamination and BVD degradation while having low ESL characteristics, by improving the connection structure between the body part and the lead part in each of the internal electrodes.

While the present invention has been shown and described in connection with the embodiments, it will be apparent to those in the art that modifications and variations can be made without departing from the spirit and scope of the invention as defined by the appended claims.

What is claimed is:

1. A multilayer ceramic electronic part, comprising:
a ceramic element having a plurality of dielectric layers laminated therein; and
a plurality of first and second internal electrodes each including a body part formed on at least one surface of each of the plurality of dielectric layers within the ceramic element, the first and second internal electrodes including first and second lead parts extended from one surface of the body parts to be exposed through one surface of the ceramic element, respectively,
inside connection portions between the body parts and the first and second lead parts being curvedly formed, and having a curvature radius of 30 to 100 μm.

2. The multilayer ceramic electronic part of claim 1, wherein in each of the body parts of the first and second internal electrodes, corner portions of an edge thereof are curvedly formed.

3. The multilayer ceramic electronic part of claim 1, wherein a distance between the first lead part and the second lead part is at least 200 μm or more.

4. The multilayer ceramic electronic part of claim 1, further comprising first and second external electrodes formed on one surface of the ceramic element, and electrically connected to the first and second internal electrodes through exposed portions of the first and second lead parts, respectively.

5. The multilayer ceramic electronic part of claim 1, wherein the body part has a thickness of 0.2 to 1.0 μm.

6. The multilayer ceramic electronic part of claim 1, wherein the first and second lead parts each have a thickness of 0.2 to 1.0 μm.

7. The multilayer ceramic electronic part of claim 1, wherein the first and second lead parts are disposed alternately with each other along a long side of each of the body parts.

8. The multilayer ceramic electronic part of claim 1, wherein the first and second lead parts have the same width.

9. The multilayer ceramic electronic part of claim 1, wherein the first and second lead parts have different widths.

10. The multilayer ceramic electronic part of claim 1, wherein the first and second lead parts are positioned in the middle of the first and second external electrodes, respectively.

11. The multilayer ceramic electronic part of claim 1, wherein the first and second internal electrodes are laminated in a direction perpendicular with respect to a forming direction of the first and second external electrodes.

12. The multilayer ceramic electronic part of claim 1, wherein the first and second external electrodes are spaced apart from the one surface of the ceramic element.

13. A method of manufacturing a multilayer ceramic electronic part, the method comprising:
forming first and second internal electrode layers on at least one surface of each of first and second ceramic sheets, respectively, and thereby defining margin parts outside the first and second internal electrode layers, respectively;
forming first and second lead layers on a side portion of the margin parts on the first and second ceramic sheets, respectively, so as to allow the first and second internal electrode layers to be connected to one surfaces of the first and second ceramic sheets, respectively;
laminating the plurality of the first and second ceramic sheets on which the first and second internal electrode layers and the first and second lead layers are respectively formed, alternately with each other, to form a laminate; and
firing the laminate,
inside connection portions between the first and second internal electrode layers and the first and second lead layers being curvedly formed, and having a curvature radius of 30 to 100 μm.

14. The method of claim 13, wherein in each of the first and second internal electrode layers, corner portions of an edge thereof are curvedly formed.

15. The method of claim 13, wherein a distance between the first lead layer and the second lead layer is at least 200 μm or more.

16. The method of claim 13, further comprising forming first and second external electrodes so as to cover exposed surfaces of the first and second lead layers.

17. The method of claim 13, wherein the first and second internal electrode layers each have a thickness of 0.2 to 1.0 μm.

18. The method of claim 13, wherein the first and second lead layers each have a thickness of 0.2 to 1.0 μm.

19. The method of claim 13, wherein the first and second lead layers are formed alternately with each other along a long side of the first or second internal electrode layer on the first and second ceramic sheets, respectively.

20. The method of claim 13, wherein the first and second lead layers have the same width.

21. The method of claim 13, wherein the first and second lead layers have different widths.

22. The method of claim 13, wherein the first and second lead layers are positioned in the middle of the first and second external electrodes, respectively.

23. The method of claim 13, wherein in the laminate, the first and second ceramic sheets are laminated such that the first and second internal electrode layers are disposed in a direction perpendicular to a forming direction of the first and second external electrodes.

24. The method of claim 13, wherein the first and second external electrodes are spaced apart from a surface of the laminate.

* * * * *